(12) United States Patent
Ross et al.

(10) Patent No.: US 8,891,343 B2
(45) Date of Patent: Nov. 18, 2014

(54) METHOD FOR FORMATTING AND READING DATA DISKS

(75) Inventors: John Anderson Fergus Ross, Niskayuna, NY (US); Kenneth Brakeley Welles, Scotia, NY (US); John Erik Hershey, Ballston Lake, NY (US); Brian Lee Lawrence, Niskayuna, NY (US); Xiaolei Shi, Niskayuna, NY (US); Victor Petrovich Ostroverkhov, Ballston Lake, NY (US)

(73) Assignee: General Electric Corporation, Schenectady, NY (US)

( * ) Notice: Subject to any disclaimer, the term of this patent is extended or adjusted under 35 U.S.C. 154(b) by 1029 days.

(21) Appl. No.: 12/337,457

(22) Filed: Dec. 17, 2008

(65) Prior Publication Data

US 2010/0149934 A1  Jun. 17, 2010

(51) Int. Cl.
*G11B 7/0065* (2006.01)
*G11B 7/007* (2006.01)
*G11B 7/013* (2006.01)
*G11B 7/00* (2006.01)

(52) U.S. Cl.
CPC ............ *G11B 7/013* (2013.01); *G11B 7/00772* (2013.01); *G11B 2007/0009* (2013.01)
USPC ...................... 369/103; 369/275.3; 369/275.4; 359/1

(58) Field of Classification Search
USPC ............. 369/103, 275.1, 275.3, 275.4, 275.5, 369/44.11, 44.37; 359/1, 3
See application file for complete search history.

(56) References Cited

U.S. PATENT DOCUMENTS

| | | | |
|---|---|---|---|
| 5,142,385 A * | 8/1992 | Anderson et al. | 359/10 |
| 5,315,417 A * | 5/1994 | Moss et al. | 359/3 |
| 5,450,218 A | 9/1995 | Heanue et al. | |
| 5,510,912 A | 4/1996 | Blaum et al. | |
| 5,727,226 A | 3/1998 | Blaum et al. | |
| 5,808,998 A | 9/1998 | Curtis et al. | |
| 6,175,317 B1 | 1/2001 | Ordentlich et al. | |
| 6,437,886 B1 * | 8/2002 | Trepanier et al. | 359/35 |
| 6,549,664 B1 | 4/2003 | Daiber et al. | |
| 6,563,779 B1 | 5/2003 | McDonald et al. | |

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Thomas Alunkal
(74) *Attorney, Agent, or Firm* — Jean K. Testa; Fletcher Yoder, P.C.

(57) ABSTRACT

The present techniques present methods and systems for increasing a data reading rate on optical data disks using a single reading head. The methods take advantage of the difference between a mean focal distance (MFD), or minimum spacing that the detector can distinguish between bits, and the minimum separation of bits in a single track to increase the reading speed. As the bits may be more closely spaced across adjacent tracks or layers, these techniques may be used to increase the reading speed of the disk. Specifically, the data symbols that make up a single bit-stream may be stored in a pattern horizontally across adjacent tracks, or vertically across adjacent layers. Accordingly, the focal point of the detector is scanned across the disk in the same pattern to read the individual data symbols.

22 Claims, 9 Drawing Sheets

(56) References Cited

U.S. PATENT DOCUMENTS

| | | |
|---|---|---|
| 6,614,741 B1 * | 9/2003 | Hesselink et al. ............ 369/103 |
| 6,711,711 B2 | 3/2004 | Hwang |
| 6,738,322 B2 | 5/2004 | Amble et al. |
| 6,889,907 B2 | 5/2005 | Roh |
| 7,020,054 B2 | 3/2006 | Kadlec et al. |
| 7,050,207 B1 * | 5/2006 | Hiraga et al. .................. 359/15 |
| 7,164,514 B2 * | 1/2007 | Raguin ............................. 359/3 |
| 7,388,695 B2 | 6/2008 | Lawrence et al. |
| 2002/0163873 A1 * | 11/2002 | Kawano et al. ............... 369/103 |
| 2004/0103136 A1 * | 5/2004 | Harding ........................ 709/200 |
| 2004/0264340 A1 * | 12/2004 | Yamatsu ....................... 369/103 |
| 2005/0136333 A1 | 6/2005 | Lawrence et al. |
| 2005/0180291 A1 * | 8/2005 | Ogasawara ................... 369/103 |
| 2006/0073392 A1 | 4/2006 | Erben et al. |
| 2006/0078802 A1 | 4/2006 | Chan et al. |
| 2006/0164948 A1 * | 7/2006 | Seko et al. .................... 369/103 |
| 2006/0187794 A1 * | 8/2006 | Harvey et al. ................. 369/103 |
| 2007/0097469 A1 | 5/2007 | Erben et al. |
| 2007/0146835 A1 | 6/2007 | Erben et al. |
| 2008/0055686 A1 | 3/2008 | Erben et al. |
| 2008/0089209 A1 * | 4/2008 | Miyamoto et al. ........ 369/112.23 |
| 2008/0144145 A1 | 6/2008 | Boden et al. |
| 2008/0144146 A1 * | 6/2008 | Boden et al. ...................... 359/3 |
| 2008/0239922 A1 * | 10/2008 | Fujita et al. ................... 369/103 |
| 2009/0003177 A1 * | 1/2009 | Tanabe ............................ 369/94 |
| 2009/0238059 A1 * | 9/2009 | Wu et al. ....................... 369/103 |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2—5:00.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

U.S. Appl. No. 12/342,794, filed Dec. 23, 2008, John Anderson Fergus Ross et al.

U.S. Appl. No. 12/343,204, filed Dec. 23, 2008, Ruediger Kusch.

U.S. Appl. No. 12/346,279, filed Dec. 30, 2008, Victor Ostroverkhov et al.

U.S. Appl. No. 12/346,378, filed Dec. 30, 2008, Xiaolei Shi et al.

U.S. Appl. No. 12/347,178, filed Dec. 31, 2008, Victor Ostroverkhov et al.

U.S. Appl. No. 12/347,211, filed Dec. 31, 2008, Xiaolei Shi et al.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

\* cited by examiner

METHOD FOR FORMATTING AND READING DATA DISKS

BACKGROUND

The present techniques generally relate to storing and reading data from optical data disks. More specifically, the techniques provide methods and systems for increasing the speed of reading data from optical data disks without increasing the rotational speed.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disk (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disk™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data, typically a plurality of bits, is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography, or micro-holographic data storage, every bit is written as a micro-hologram, or reflection grating, typically generated by two counter-propagating focused recording beams. The data is then retrieved by using a reading beam to diffract off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, they may still be limited in reading speed by physical properties. Accordingly, techniques that increase the reading speed are desirable.

BRIEF DESCRIPTION

A contemplated embodiment of the present techniques provides a method for reading a data stream from a data disk. The method includes emitting a reading beam at a data disk, and adjusting the reading beam to illuminate a plurality of micro-reflectors, wherein the micro-reflectors are arranged in a pattern horizontally, vertically, or both. The light from the micro-reflectors is then detected.

Another contemplated embodiment provides a system for reading a data disk. The system includes an emitter configured to generate a reading beam, and an optical device configured to adjust the reading beam to illuminate a plurality of micro-reflectors arranged in a pattern. The micro-reflectors reflect light from the reading beam, and a detector is configured to detect the reflected light and convert the reflected light into a signal.

Another contemplated embodiment provides a data disk, which includes a data storage layer configured to store a pattern representing a sequence of bits from a data stream. The pattern is an arrangement of micro-reflectors on the data disk. The data disk includes a protective layer configured to protect the data layer.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
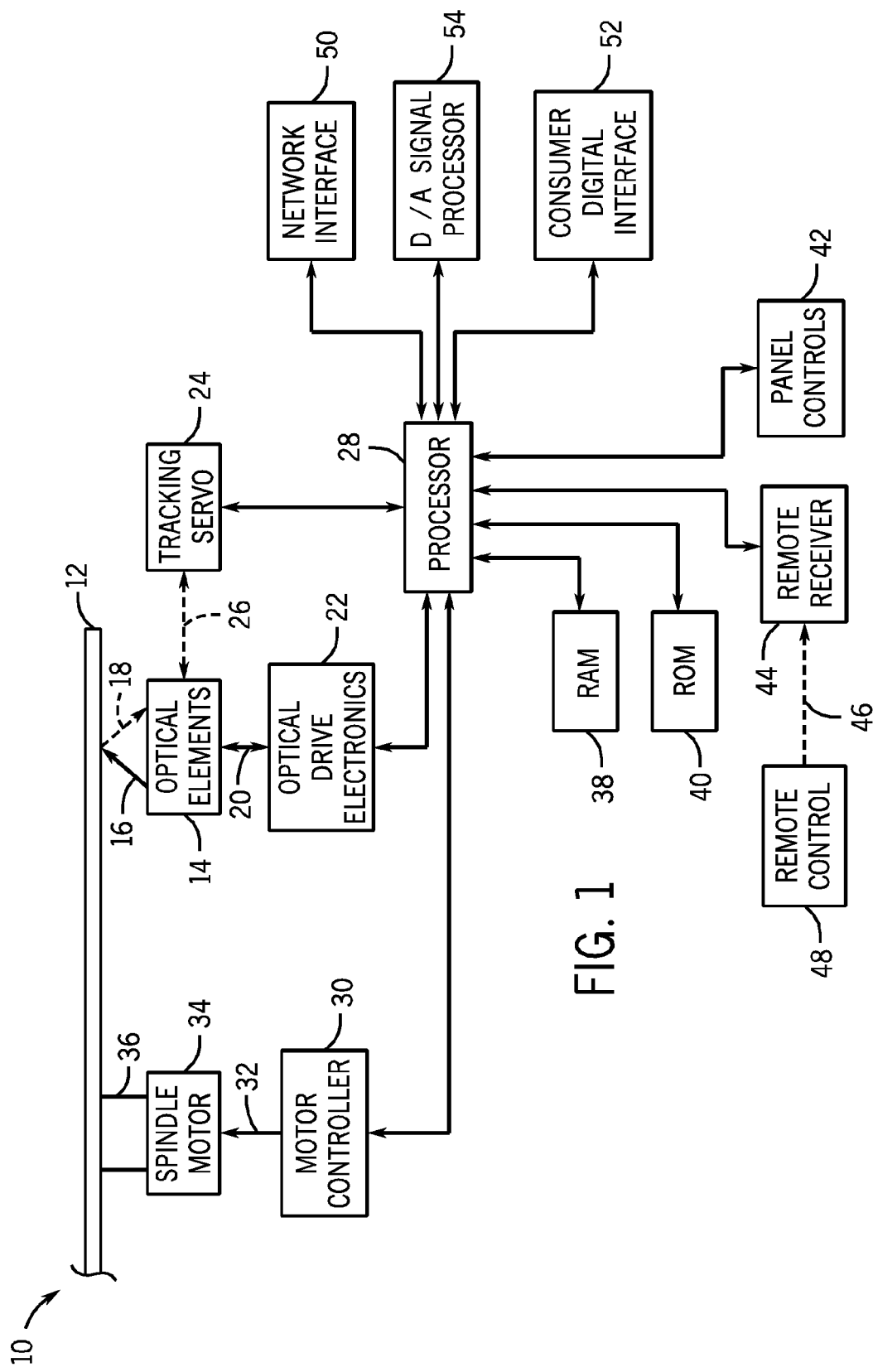
FIG. 1 is a block diagram of an optical disk reader, in accordance with embodiments of the present technique.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Present optical storage systems use changes in a reflective surface to store data sequences. For example, the change in light intensity caused by moving a reading beam from the reflective surface into a pit, or out of a pit, in the reflective surface may represent a binary one, while no change in intensity may represent a binary zero. In contrast, bit-wise holographic systems may use the presence or absence of a micro-hologram to indicate a binary one or zero, respectively.

The use of micro-holograms may allow for higher storage densities than current optical storage technologies, as the size of any individual micro-hologram may be smaller than the pits currently used in optical data storage. Further, a holographic data disk may include multiple data storage layers. However, the increased amount of data stored on a holographic data disk may make faster reading systems advantageous.

Generally, two factors control the reading speed of a disk: the rotational velocity of the disk; and the horizontal separation between data symbols, such as the micro-holograms. Although a higher reading speed may be achieved at a higher rotational velocity, the maximum rotational velocity of a disk is limited by physical considerations. If the rotational velocity is too high, the disk may actually disintegrate. One method that may increase data rate without requiring higher rotational speed is to read data in parallel with multiple reading heads or illumination sources. However, this may increase the cost and complexity of the disk drive.

The separation between data symbols will also influence the reading speed. Two separations are important to controlling the reading speed in the techniques discussed herein: the separation between individual symbols; and the ability of the detector to distinguish between adjacent symbols. The separation between individual data symbols, such as micro-holograms on a single track, controls how often a data symbol passes under a reading head. The separation may be limited by the size and shape of the individual data symbols. For example, the micro-holograms may not be spherical, but may instead be oblong, which may increase the required distance between symbols. Further, the efficiency of the photosensitive material used to make the micro-holograms may also limit the minimum separation between symbols on a single track.

The ability of the detector to distinguish between adjacent symbols, which may be termed the mean focal distance (MFD), may also affect the reading speed. The MFD is defined as the minimum separation that an optical system may need to distinguish between proximate symbols. The MFD may be substantially lower than the minimum horizontal separation between data symbols.

The present techniques include methods and systems for increasing a data reading rate on optical data disks using a single reading head. The methods take advantage of the difference between the MFD and the minimum separation of bits in a single track to increase the reading speed. As the bits may be more closely spaced across adjacent tracks or layers, these techniques may be used to increase the reading speed of the disk. Specifically, the data symbols that make up a single bit-stream may be stored in a pattern horizontally across adjacent tracks, or vertically across adjacent layers. This pattern may be either non-linear or linear. Accordingly, the focal point of the detector may be scanned across the disc in the same pattern to read the individual data symbols.

An Optical Disk Reader

Figure 9:
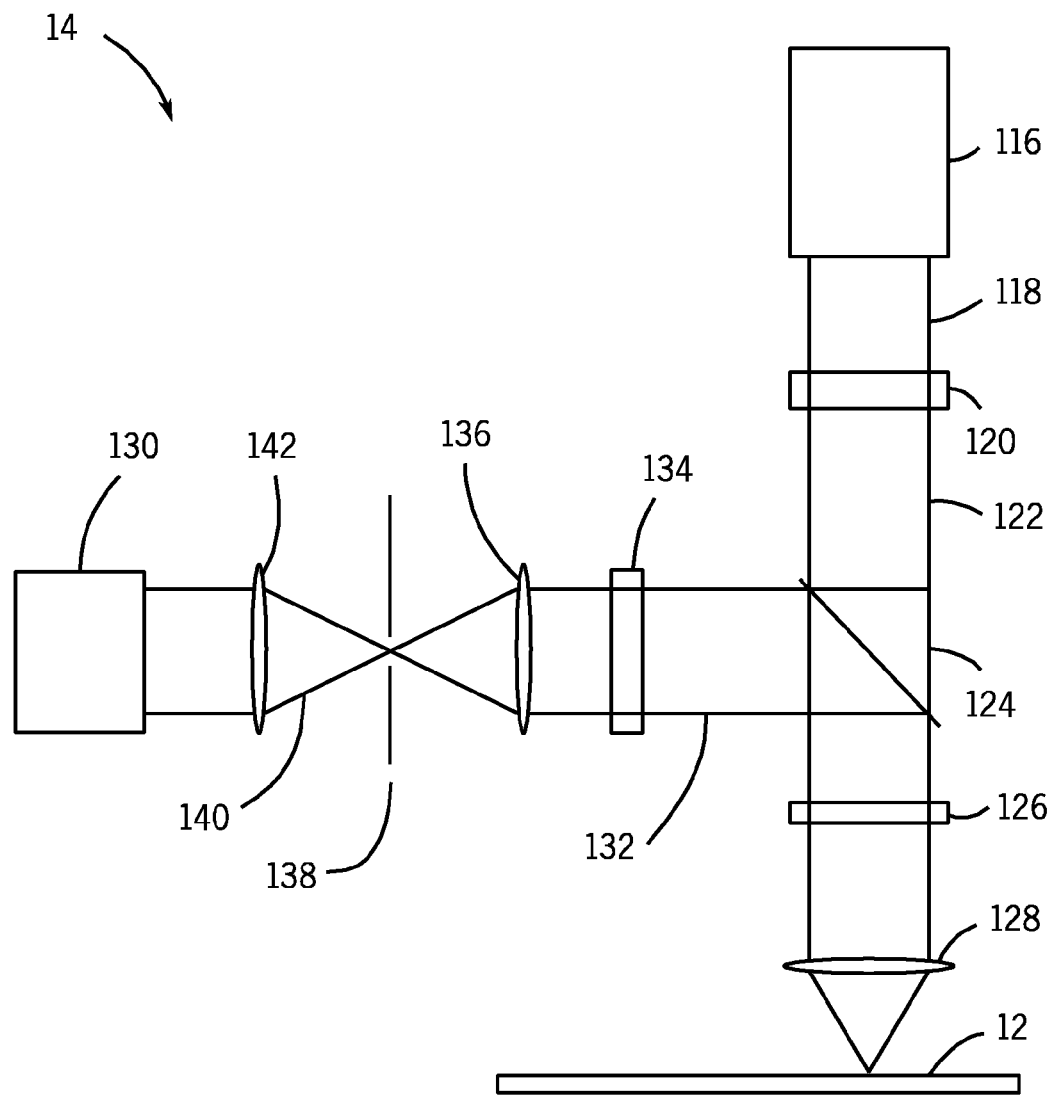
FIG. 9 is a perspective view of a reading head that may be used to read a non-sequential bit-pattern, in accordance with an embodiment.

Turning now to the figures, FIG. 1 is an optical reader system 10 that may be used to read data from optical storage discs 12. The data stored on the optical data disc 12 is read by optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12, as discussed further with respect to FIG. 9. The optical elements 14 are controlled through a coupling 20 to optical drive electronics 22. The optical drive electronics 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24, which has a mechanical actuator 26 configured to move the optical elements back and forth over the surface of the optical data disc 12. The optical drive electronics 22 and the tracking servo 24 are controlled by a processor 28. The processor 28 also controls a motor controller 30 which provides the power 32 to a spindle motor 34. The spindle motor 34 is coupled to a spindle 36 that couples with the optical data disk 12, and controls the rotational speed of the optical data disc 12. As the optical elements 14 are moved from the outside edge of the optical data disc 12 closer to the spindle 36, the rotational speed of the optical data disc 12 may be increased by the processor 28. This may be performed to keep the data rate of the data transferred from the optical data disc 12 essentially the same when the optical elements 14 are at the outer edge as when the optical elements are at the inner edge. The maximum rotational speed of the disk may be about 500 revolutions per minute (rpm), 1000 rpm, 1500 rpm, 3000 rpm, 5000 rpm, 10,000 rpm, or higher. As discussed herein, the rotational speed may be limited by the physical properties of the optical data disc 12.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronics device, it may have controls to allow the processor 28 to be accessed and controlled by a user. Such controls may take the form of panel controls 42, such as keyboards, program selection switches, disk ejection buttons, and the like. Further, control of the processor 28 may be performed by a remote receiver 44. The remote receiver 44 may be configured to receive a control signal 46 from a remote control 48. The control signal 46 may take the form of an infrared beam, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or a high-speed serial interface, such as a USB port, among others. The processor 28 may also have other connected interface units such as a digital-to-analog signal processor 54. The digital-to-analog signal processor 54 may allow the processor to provide an analog signal for output to other types of devices, such as to an analog input signal on a television or to an audio signal input to an amplification system.

Figure 2:
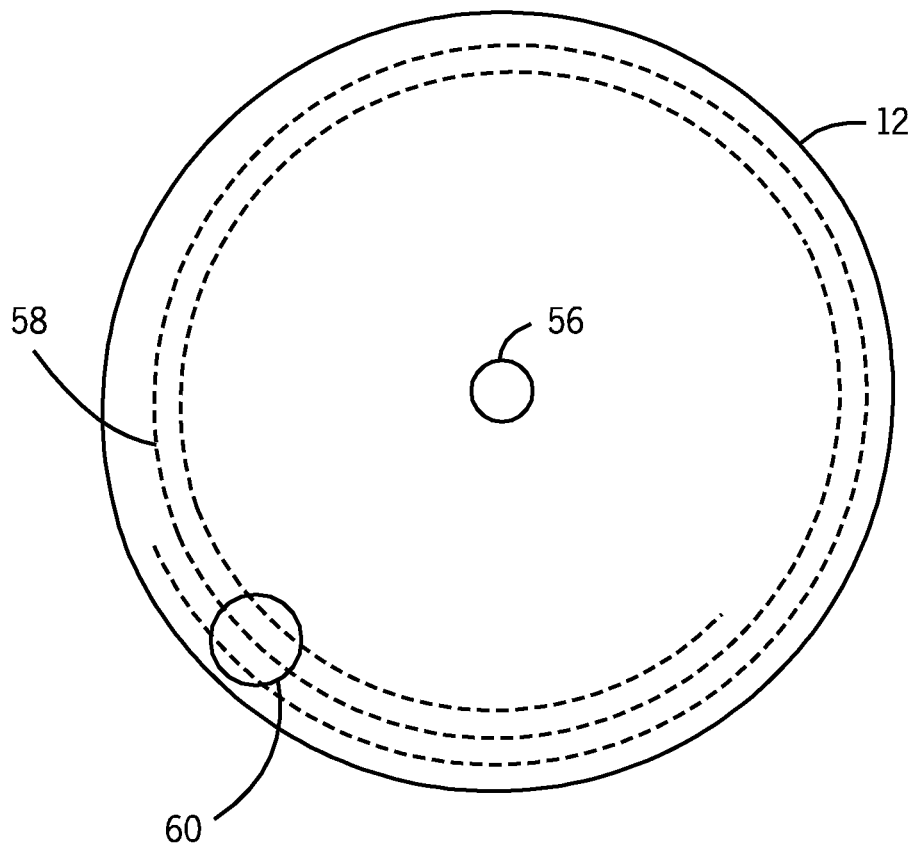
FIG. 2 illustrates an optical disk having data tracks, in accordance with embodiments of the present techniques.

The reader 10 may be used to read an optical data disk 12 containing stored data as shown in FIG. 2. The disk 12 has a spindle hole 56 to allow for control of the rotational velocity by the spindle 36. Data may be written in a single sequential spiraling track 58 from the outer edge of the disk 12 to an inner limit, although circular tracks, or other data configurations, may be used. Generally, the data is written onto data storage layers, such as a holographic data storage layer. In other contemplated embodiments, the data storage layer may include a reflective surface wherein data is represented by variations in reflectivity, e.g., pits and lands. A protective layer is formed over the data storage layers, such as a polycarbonate layer, a polyacrylate layer, and the like. In the present techniques, data may be written in a pattern, such as a non-linear pattern, an oscillating pattern, a sawtooth pattern, an interlaced pattern, a linear pattern, or any combinations thereof, across multiple sequential tracks 60 as discussed with respect to FIG. 7, or across multiple layers, as discussed with respect to FIG. 8. Furthermore, data may be written in either sequential patterns, or in horizontally or vertically oscillating patterns. A sequence for writing micro-holograms may be determined from, for example, an address generator, a look-up table, or a state machine.

Forming the data in the storage medium may be performed by constructive interference of two laser beams at each site that a micro-hologram is to be formed. The constructive interference of the two beams may, for example, change the refractive index at the point the micro-hologram is formed. Different materials may be used for the storage layer, including for example, photosensitive materials that have a chemical reaction upon irradiation with the crossed beams, or materials that have a physical phase change upon irradiation. Examples of procedures that may be used with different materials include those presented in U.S. Pat. No. 7,388,695 B2, incorporated herein by reference in their entirety. However, if any terms, definitions, or usages conflict between these applications and the present application, the terms, definitions, and usages in the present application take precedence.

Reading a Data Disk

Figure 3:
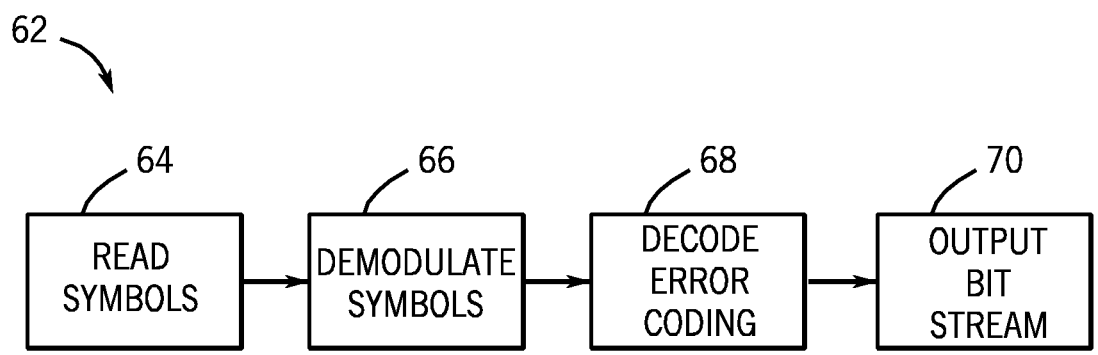
FIG. 3 is a flow chart of a method for reading data from an optical data disk, in accordance with embodiments of the present technique.

A general process 62 by which the optical reader system 10 may read data from an optical data disc 12 is shown in the block diagram of FIG. 3. The process 62 begins in block 64 by reading a symbol from the optical data disc 12. The symbol may include, for example, a sequence of bits that have been selected to represent a certain byte value. The symbols may be selected to provide a substantially uniform distribution of reflective and non-reflective regions across the disk 12, making the data stored on the disk 12 more resistant to interference between bits and optical imperfections on the surface of the disc 12.

The symbol identified in block 64 may then be demodulated. As shown in block 66, demodulation of the symbol may be performed by comparing the symbol to values stored in a lookup table, or by analyzing the symbol by a mathematical algorithm. In either case, demodulation identifies the unique sequence of bits corresponding to the symbol. Once the bit sequence has been identified, the bit pattern is assembled into a bit stream, which is generally formed by sequentially concatenating the bit sequences.

The bit stream may then be further processed, for example, by being decoded to remove any redundant bits added for error correction coding, as shown in block 68. This decoding may, for example, remove the extra bits associated with Reed Solomon error correction, among others, and use these redundant bits to identify and correct a limited number of errors in the bit stream. Upon decoding of the bit stream, a digital signal is formed, which may then be output in block 70. For example, the digital signal may be provided to the network interface 50, the consumer digital interface 52, or converted into an analog data signal in the digital-to-analog signal processor 54.

Patterns for Data Storage on an Optical Disk

Figure 4:
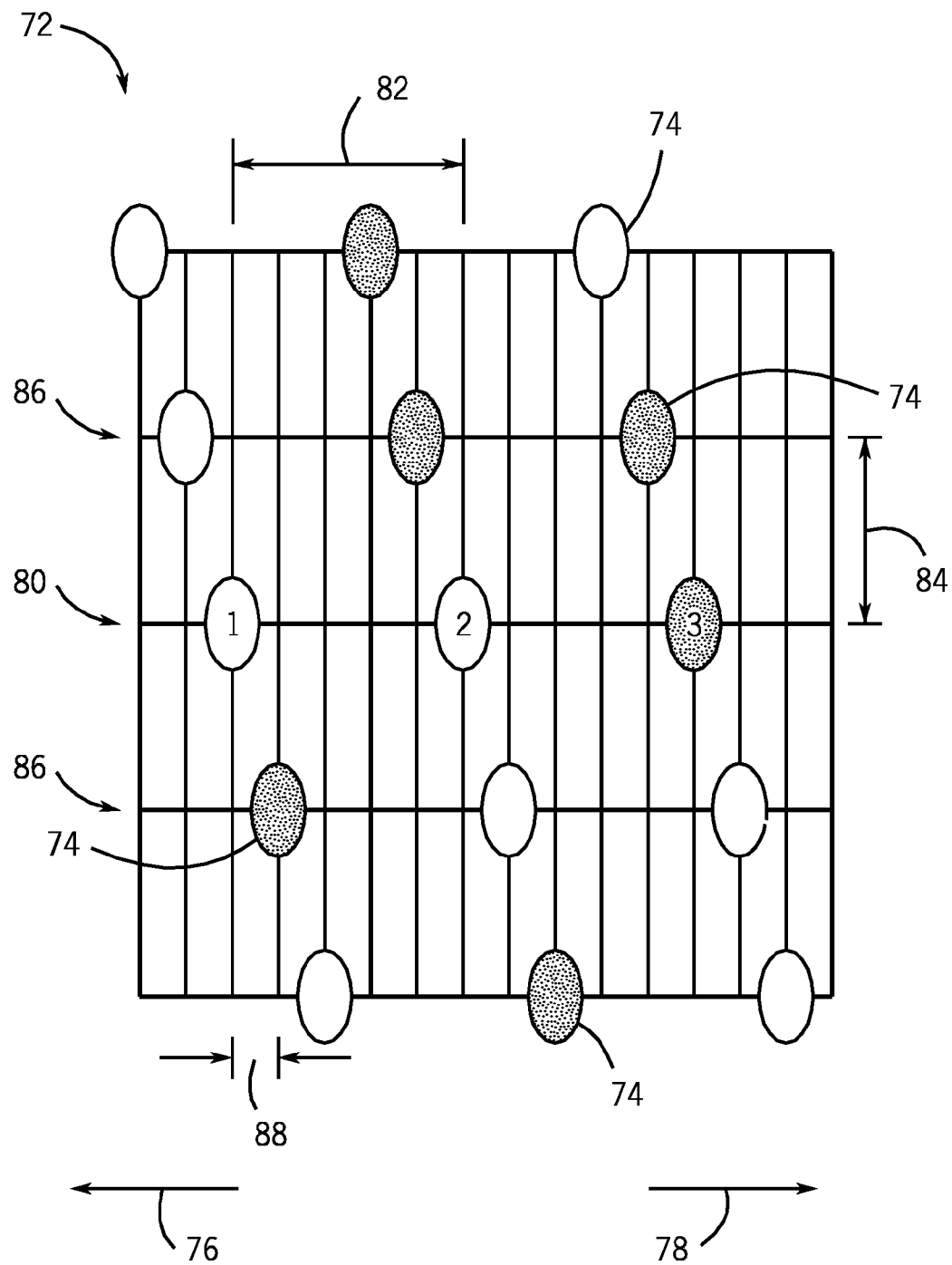
FIG. 4 is a top view of data tracks on an optical data disk, showing bits arranged in a sequential bit-pattern in single tracks.

As discussed herein, the data may be written to the data disk 12 in a single sequential spiral track 58. In effect, this creates multiple adjacent tracks, which may contain data symbols written in the sequential pattern 72 illustrated in the top view of a disk 12 shown in FIG. 4. As shown in FIG. 4, the individual bits 74 of a single bit-stream are arranged in a linear pattern along each track, wherein, for example, the presence of a micro-hologram, as indicated by the shaded ovals, may indicate a binary one, while the absence of a micro-hologram, as indicated by the empty ovals, may indicate a binary zero. However, other configurations may be used to indicate stored data. For example, the presence of a micro-hologram may be used to indicate a binary zero. Alternatively, a change from the presence to the absence of micro-holograms, and vice-versa, may be used to indicate a binary one.

The rotation direction 76 of the disk 12 determines the reading direction 78. The bits 74 along a single track 80 may be read in a linear fashion, as indicated by the bits 74 labeled 1, 2, and 3. Each of the adjacent bits 74 in the track 80 will have sufficient separation 82 between them to minimize interference. The potential for interference between nearby bits 74 may also be decreased by providing sufficient separation 84 between the track 80 and the adjacent tracks 86. However, the separation 88 between bits 74 across adjoining tracks 80 and 86 may be narrower than the separation 82 between bits 74 in a single data track 80.

Figure 5:
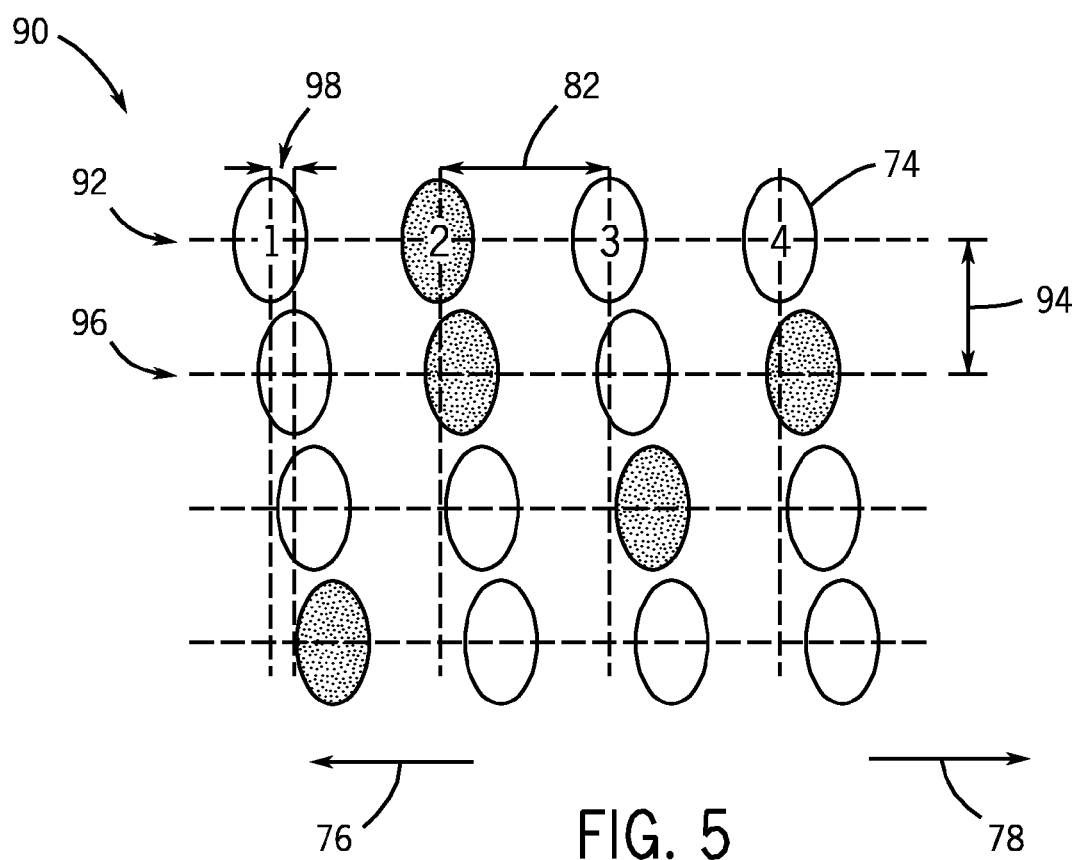
FIG. 5 is a side view of data layers on an optical data disk, showing bits arranged in a sequential bit-pattern in a single layer.

A similar reading pattern 90 may be used for bits 74 in adjacent data layers, as shown in the cross sectional view of a disk 12 illustrated in FIG. 5. As with the reading pattern 72 illustrated in FIG. 4, the bits 74 in a single layer 92 are generally read sequentially, as indicated by the bits 74 labeled as 1, 2, 3, and 4. The separation 94 between the data layer 92 and adjacent layers 96 will generally be set sufficiently high enough to minimize interferences between the bits 74 in each of the layers 92 and 96. However, the separation 98 in the reading direction 78 between bits in adjacent layers 96 may be set much closer, for example, at or just above the MFD.

The decreased separation in the reading direction that may exist between bits in adjacent tracks or layers may be used to increase the efficiency, and thus the speed, of reading the disk. For example, the data bits may be stored across tracks or layers in a pattern, and the focal point of the reading beam may then be adjusted to highlight each of the individual bits. The reading direction 78 may read bits 74 along a single track 80 sequentially (e.g., bits 74 labeled 1, 2, 3). As will be discussed, in some embodiments, the reading direction 78 may also be vertical (i.e., through the layers of the disk), and may appear to be angled in the disk 12, as the disk may be rotating or moving as the disk 12 is read. The positioning of the bits 74 in the disk 12 may also appear to be angled in the disk 12 to compensate for the movement of the disk 12 during reading. For example, the focal point of the reading beam may move up and down to read the disk 12, and the disk 12 may also be rotating. The bits 74 may be positioned in the disk 12 to match the rotation of the disk 12 and the vertical displacement of the reading beam. The positioning of the bits 74 may enable the reading direction 78 to be vertical as well as horizontal for a faster reading of the disk 12.

Figure 6:
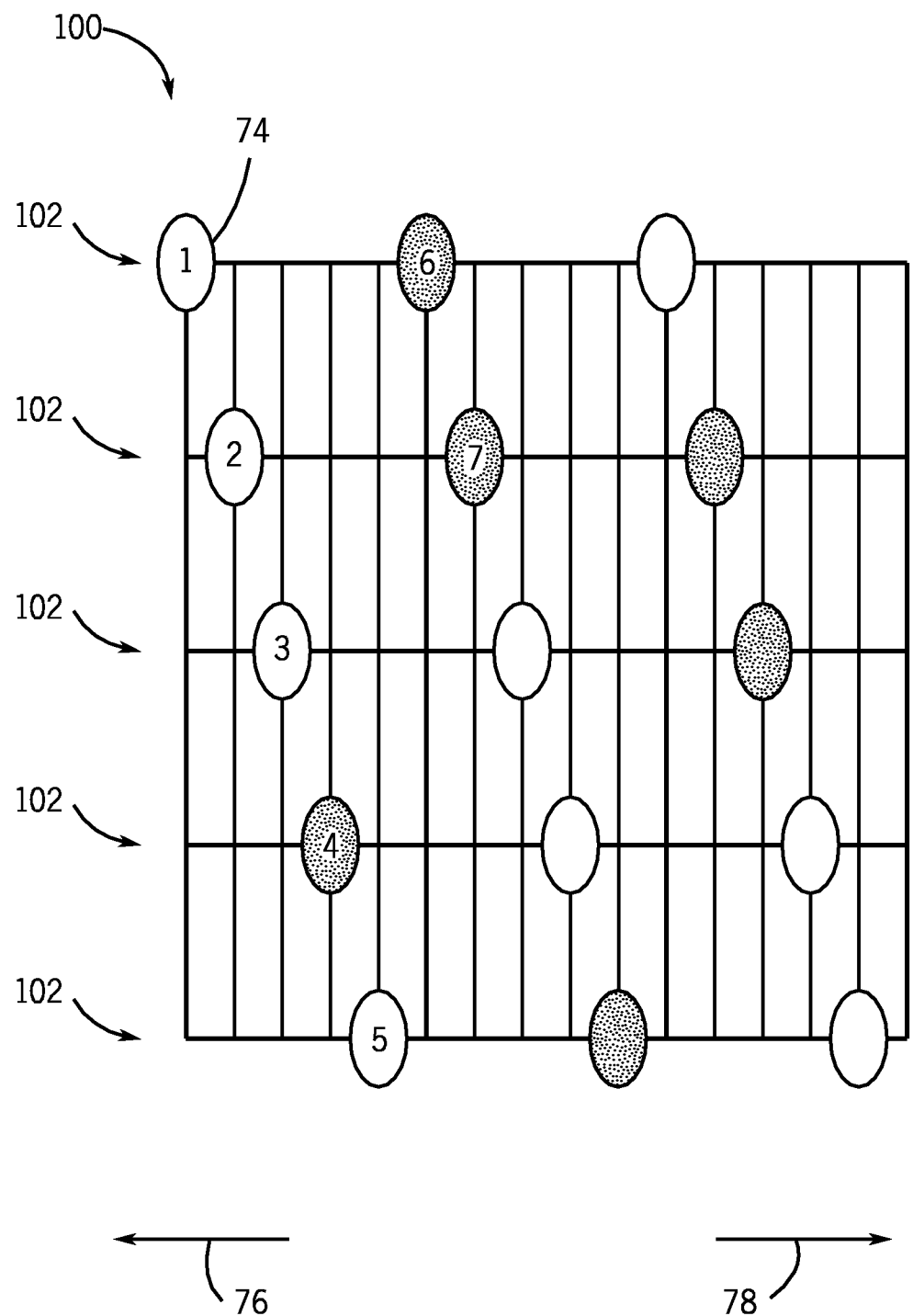
FIG. 6 is a top view of data tracks on an optical data disk, showing bits arranged in a non-sequential bit-pattern across multiple tracks, in accordance with an embodiment.

An example of a reading pattern 100 that may be used in a contemplated embodiment is shown in FIG. 6, which is a top-view of a data disk 12. In contrast to the reading pattern 72 illustrated in FIG. 4, the bits 74 in a single bit sequence may be written in a pattern across the data tracks 102. Accordingly, the bits 74 are read in the numerical order shown, for example, in the saw-tooth pattern illustrated for the bits labeled 1-7. In comparison to the data pattern 72 illustrated in FIG. 4, the reading pattern 100 illustrated in FIG. 6 may provide as much as five times the reading speed. Other patterns may provide even higher gains in speed, depending on the spacing of the bits 74 and the response time of the mechanism used to adjust the focal point.

In other contemplated embodiments, the data may be written across multiple layers. For example, in the cross-sectional view of a data disk 12 illustrated in FIG. 7, the reading pattern 104 is indicated by the bits 74 labeled 1, 2, 3, 4, and 5. In this embodiment, the separation 98 between bits 74 in successive layers 106 may be as low as the MFD, allowing for a substantial gain in reading speed. Further, as each bit may be a micro-hologram, the phase of the bits 74 on each successive layer may be modulated to improve the reading performance and decrease the interference from other layers. For example, the phase angle of a first layer may be set at about 0°, a second layer may be set at 15°, a third layer may be set at 30°, a fourth layer may be set at 45°, and so on. If the reading beam is then phase modulated, for example, using the detector discussed further below with respect to FIG. 9, light reflected from layers that do not match the phase of the reading beam may not be detected, and, thus, may not interfere with the signal from the target layer. As bits 74 in adjacent layers may not interfere with the reading of the bit that matches the modulation of the reading beam, this may allow for very close spacing of bits 74 between data layers, further enhancing the reading speed. It should be understood that the phase angles above are merely exemplary of contemplated embodiments. Many more layers and phase angles may be used, depending on the limits of the detection optics to distinguish between the individual phase angles and the response time of the device used to adjust the phase of the reading beam.

Figure 7:
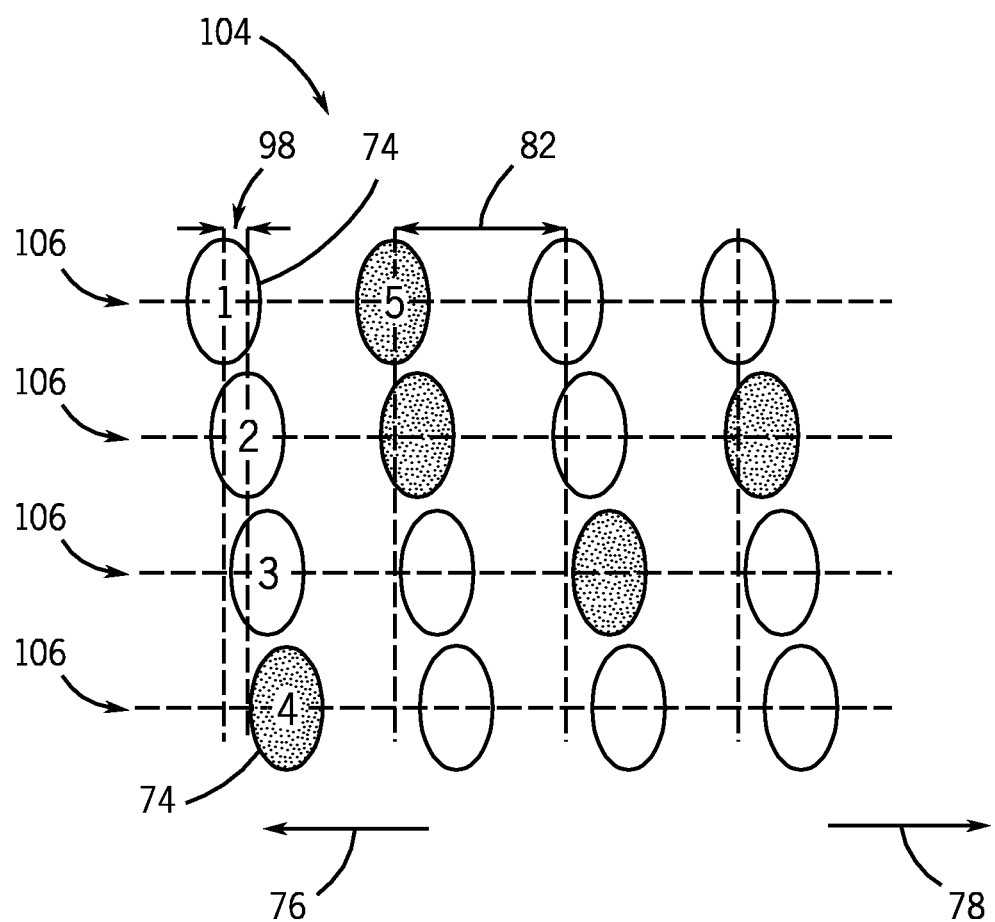
FIG. 7 is a side view of data layers on an optical data disk, showing bits arranged in a non-sequential bit-pattern in a single layer, in accordance with an embodiment.
Figure 8:
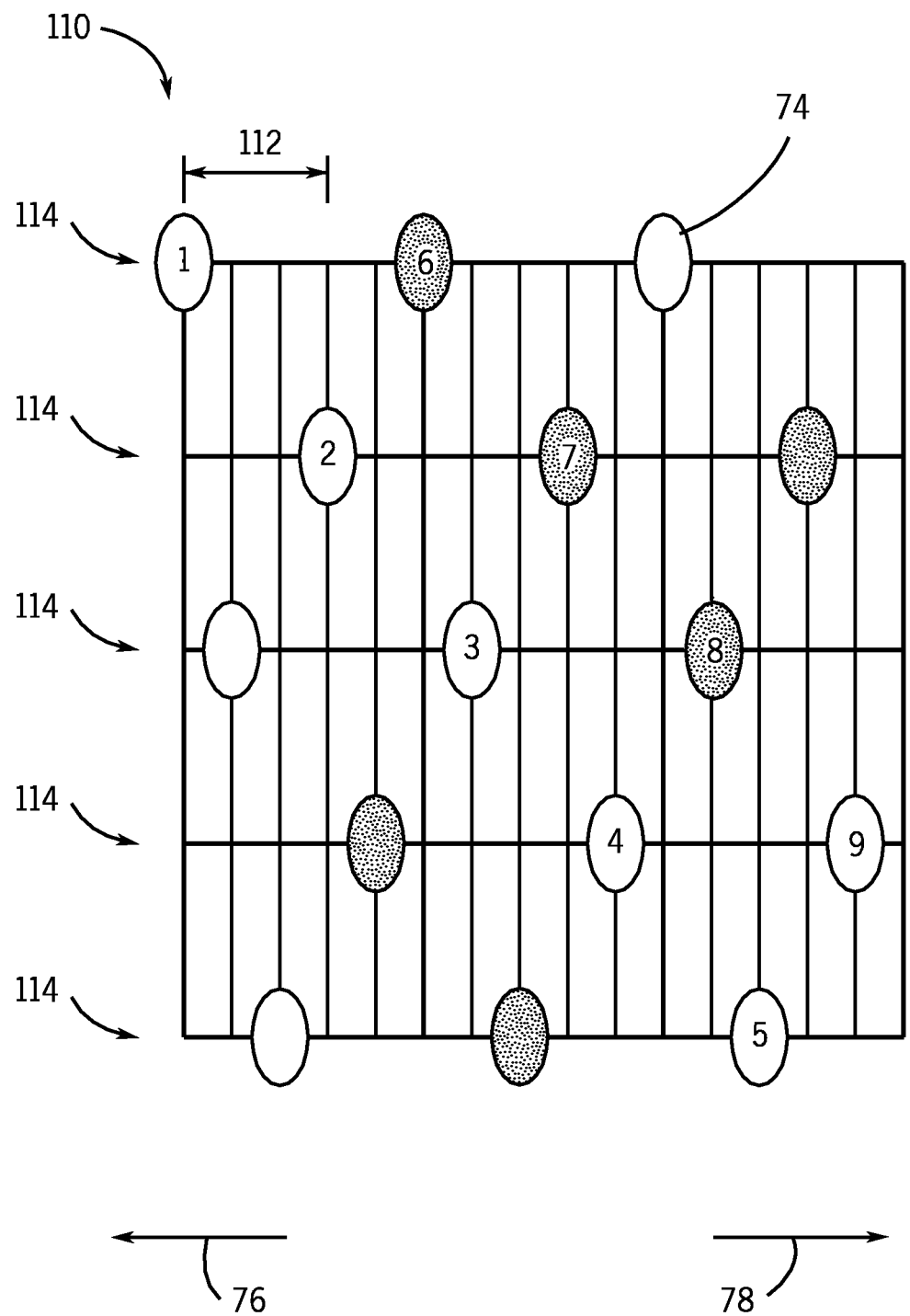
FIG. 8 is a top view of data tracks on an optical data disk, showing bits arranged in an interlaced non-sequential bit-pattern across multiple tracks, and is also a side view of data tracks in an optical data disk, showing bits arranged in a pattern across multiple layers, in accordance with an embodiment.

The reading patterns are not limited to sequential patterns as discussed with respect to FIGS. 6 and 7. For example, an interlaced pattern 110 may be used, among others, as shown in FIG. 8. FIG. 8 may depict either a top view of a data disk 12, where bits are arranged in a pattern across multiple tracks, or a side view of a data disk 12, where bits are arranged in a pattern across multiple layers. As indicated by the numbered bits 74, the reading pattern may overlap over successive tracks or layers 114. Such a pattern may be read, for example, by multiple passes of the reading head over the disc 12. Although the reading speed may not be as great as that shown for FIG. 6, the physical requirements for adjusting the focal point of the reading beam may also be decreased. Such a configuration may allow some of the benefits of the disclosed techniques to be achieved, while placing lower demands on the design.

Detector Configurations for Reading Patterns

Reading the bit patterns above may be performed using any number of optical configurations for the detector. For example, referring also to FIG. 1, a detector that may use an electro-optical phase modulator to vary the phase angle of a reading beam, and thus read data from multiple layers of a data disk 12 in accordance with embodiments of the present techniques, is illustrated in the schematic view of optical elements 14 shown in FIG. 9.

The detector has a light source 116 that generally includes lasers, laser diodes, super-luminescent diodes, and other coherent sources. The light source 116 may emit a collimated beam 118 of coherent light. In other embodiments, the beam from the light source 116 may be collimated by optics located outside of the light source 116. The collimated beam 118 may be passed through an electro-optic modulator (EOM) 120 to control the phase of the reading beam. The EOM 120 may be a Pockel cell, a Kerr cell, or similar types of units that allow electrical control of electromagnetic properties, e.g., polarization, birefringence, and the like.

In a neutral configuration, the EOM 120 may be unpowered, allowing light to pass with a minimal adjustment to the phase angle, such as a quarter wave or half wave phase delay. The EOM 120 may be energized at different levels to change the phase delay of the light. From the EOM 120, the phase adjusted light 122 passes through a polarizing beam splitter 124. In other embodiments, the EOM 120 may be placed in other locations, such as after the polarizing beam splitter 124. The phase delayed light 124 may then pass through a quarter wave plate 126, prior to being focused on the data disk 12 by a focusing lens 128. The focusing lens 128 collects and collimates the light reflected back from the data disk 12, prior to passing this light back though the quarter wave plate 126. After the second pass through the quarter wave plate 126, the majority of the light may be reflected by the polarizing beam splitter 124 towards the detector 130. The reflected light 132 may be passed through a second EOM 134 to further adjust the phase angle. This may be performed, for example, to compensate for intensity differences in the reflected light caused by adjusting the phase prior to the polarizing beam splitter 124. The reflected light 132 may then be passed through a focusing lens 136, which focuses the light through a pinhole filter 138. The pinhole filter 138 blocks off-axis light and thus may filter out light from micro-holograms in data layers that are not targeted. The filtered light 140 is collimated by a final lens 142 and then impinges on the detector 130, which generates an electrical signal in proportion to the intensity of the filtered light 140.

If the bits 74 are written in a non-linear pattern across adjacent tracks, or in a sawtooth pattern in a single data layer, the EOM 120 may be replaced by a mirror apparatus, which may use a micro-mechanical device to rotate a mirror, adjusting the position of the light beam. The focal point of the collimated light beam 118 may then be moved from side-to-side to read the data bits 74.

Detector Control for Reading Patterns

Figure 10:
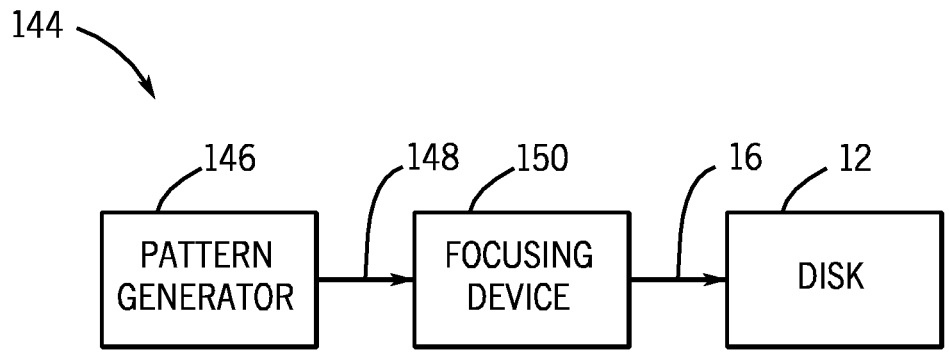
FIG. 10 is a flow chart illustrating a process for controlling a non-sequential bit-reading sequence, in accordance with an embodiment.

A process 144 for controlling the position of the focal point of the reading beam is presented in the flow chart of FIG. 10. The process 144 uses a pattern generator 146 to generate a pattern for adjusting the reading beam 16 to read bits on a data disc 12 in accordance with the present techniques. Referring also to FIG. 1, the pattern generator 146 may be a mathematical algorithm, a look-up table of bit positions, or a combination thereof, and may be stored in the ROM 40. The pattern generator 146 may be used by the processor 28 to provide a pattern 148 to a focusing device 150, generally within the optical drive electronics 22. The focusing device 150 may then adjust the focal point of the reading beam 16, either across the surface of the disk 12 or onto different layers within the disk 12. For example, adjusting the focal point of the reading beam 16 may involve adjusting the phase delay of the beam using an electro-optical modulator.

Figure 11:
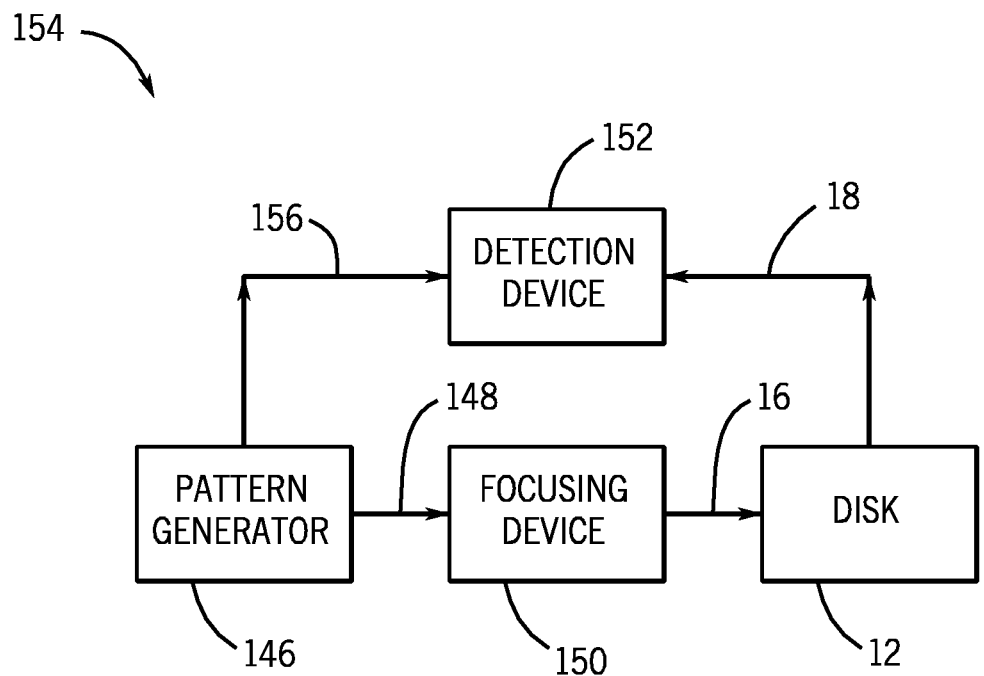
FIG. 11 is a flow chart illustrating another process for controlling a non-sequential bit reading sequence, in accordance with an embodiment.

Alternatively, the pattern generator 146 may be used to adjust both the focusing device 150 and a detection device 152, as shown in the process 154 presented in the block diagram of FIG. 11. In this application, the pattern generator 146 may use a first pattern 148 to control the focusing device 150, which controls the focal point of the reading beam 16 on the data disk 12. The reflected light 18 from the data disk 12 may then be detected by a detection device 152. The detection device 152 may be controlled by a second pattern 156 from the pattern generator 146. This may control, for example, an electro-optical modulator placed in the light path before a detector.

While only certain features of the present techniques have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for reading a data stream from a data disk, comprising:
   emitting a reading beam at a data disk;
   adjusting the reading beam to sequentially illuminate the data stream, wherein the data stream comprises a plurality of micro-reflectors arranged in one or more patterns of a set of vertical and horizontal patterns with respect to the data disk, wherein the set of vertical and horizontal patterns comprises a sawtooth pattern, a triangular pattern, a sinusoidal pattern, or a combination thereof; and
   detecting light reflected from the micro-reflectors.

2. The method of claim 1, comprising:
   determining a sequence of symbols from the light reflected from the micro-reflectors;
   decoding the sequence of symbols to determine an encoded bit stream; and
   decoding the encoded bit-stream to generate a data stream.

3. The method of claim 1, wherein:
   adjusting the reading beam comprises at least one of moving a focal point of the reading beam in a horizontal oscillating pattern across multiple tracks of a layer of the data disk or moving a focal point of a reading beam in a vertical oscillating pattern across multiple layers of the data disk.

4. The method of claim 3, wherein at least one of the horizontal oscillating pattern or the vertical oscillating pattern is a sawtooth pattern, a triangular pattern, a sinusoidal pattern, or a combination thereof.

5. The method of claim 1, wherein the micro-reflectors comprise micro-holograms formed in a storage medium, or pits in a reflective surface.

6. The method of claim 1, wherein adjusting the reading beam comprises vibrating a reading head at a selected frequency, wherein the selected frequency corresponds to a frequency used to form the micro-reflectors using a vibrating write head.

7. The method of claim 2, comprising:
   converting the data stream to an analog signal; and
   providing the analog signal to an external device.

8. The method of claim 2, comprising:
   mapping the data stream to appropriate output lines; and
   providing the data stream to an external device.

9. The method of claim 1, wherein the micro-reflectors are written sequentially in the data stream.

10. The method of claim 9, wherein a sequence for writing the micro-reflectors is based on an address generator, a look up table, a state machine, or any other mechanism capable of storing addresses of the data stream.

11. The method of claim 3, wherein the micro-reflectors are written in at least one of the horizontal oscillating pattern or the vertical oscillating pattern.

12. The method of claim 3, wherein the micro-reflectors comprise an offset phase that is readable by at least one of the horizontal oscillating pattern or the vertical oscillating pattern of the reading beam.

13. The method of claim 12, wherein the offset phase of the micro-reflector is written by varying a height of a focus point of a writing beam directed to the data disk.

14. The method of claim 12, wherein the offset phase of the micro-hologram is written by adjusting a phase of one or more writing beams directed to the data disk.

15. A system for reading a data disk, comprising:
   an emitter configured to generate a reading beam;
   an optical device configured to modulate a phase of the reading beam to sequentially illuminate a plurality of micro-reflectors arranged in a pattern in multiple data tracks of the data disk, in multiple data layers of the data disk, or in both multiple data tracks and multiple data layers, wherein the plurality of micro-reflectors in the multiple data tracks comprise micro-reflectors arranged in a sequential oscillatory pattern, and wherein the plurality of micro-reflectors in the multiple data layers comprise micro-reflectors each offset by a phase angle with respect to a preceding micro-reflector in the pattern, and wherein the micro-reflectors reflect light from the reading beam; and
   a detector configured to detect the reflected light and convert the reflected light into a signal.

16. The system of claim 15, comprising:
   a processor configured to analyze the signal and generate a data stream; and
   an output device configured to provide the data stream to other units.

17. The system of claim 15, wherein the optical device comprises a mirror mounted on a micro-electromechanical system.

18. The system of claim 15, wherein the optical device comprises an electro-optical light modulator configured to modulate the phase of the reading beam, the reflected light, or both.

19. The system of claim 15, wherein the emitter comprises a laser diode.

20. The system of claim 15, wherein the detector comprises a multi-pixel detector.

21. The system of claim 15, wherein the output device comprises a network interface unit, a digital-to-analog signal processor, a digital interface for a consumer electronic device, or any combinations thereof.

22. The system of claim 15, comprising a pattern generator configured to control the optical device, a position of the detector, or both.

\* \* \* \* \*